May 25, 1954 L. GRASSL 2,679,619

CONTROLLED SEMICONDUCTOR RECTIFIER

Filed Sept. 9, 1950

Inventor:
Ludwig Grassl.
By [signature] Atty.

Patented May 25, 1954

2,679,619

UNITED STATES PATENT OFFICE 2,679,619

CONTROLLED SEMICONDUCTOR RECTIFIER

Ludwig Grassl, Erlangen, Germany, assignor to Siemens & Halske, Aktiengesellschaft, Berlin-Siemensstadt and Munich, Germany, a German corporation Application September 9, 1950, Serial No. 183,921

5 Claims. (Cl. 317—235)

This invention is concerned with semi-conductor rectifiers.

A brief review of the prior art is rendered below in order to support the understanding of the invention.

Semi-conductor rectifiers have been proposed, employing a germanium semi-conductor carrying two electrodes, one for the input and one for the output circuit. A small germanium block is used whose mass forms one pole of the output and input circuits, respectively. One of the two electrodes serves as a control electrode and the other as an output electrode. The electrodes form small metal pin-point contacts for engagement with the body of the semi-conductor. Spacing between the two electrode points is on the order of approximately 0.05 mm. These semi-conductor rectifiers perform in the nature of amplifiers and, so far as their operation is concerned, they may be compared with single-grid electronic tubes.

The efficiency that may be obtained with such arrangements is extraordinarily low. In order to raise the efficiency, it has been proposed to employ electrodes forming larger contact areas, e. g., knife-edge contacts, instead of the pin-point contacts so as to permit transition of greater current values.

The principal object of the invention is to raise the efficiency of controlled semi-conductor rectifiers.

This object is realized by the provision of input and output electrodes, each comprising a plurality of closely spaced electrode members, which are suitably secured in position and separated from one another by suitable insulating layers, e. g., mica or lacquer layers, each electrode member forming a contact, e. g., a knife-edge contact, for engagement with the semi-conductor.

An undesired increase in the capacitance may, however, be caused in such arrangements by the increased electrode areas, due to the extraordinarily close spacing between the individual electrode members. In accordance with another object, the invention therefore provides means for reducing and substantially avoiding such undesired increase in the capacitance.

The spacing layers between the individual electrode members may for this purpose be made of insulating material having a small dielectric constant. It is also possible to arrange the electrode members in suitable manner so as to obtain increased spacing, for example, by arranging such members axially upon the body of the rod-shaped or tubular semi-conductor.

Figure 2:
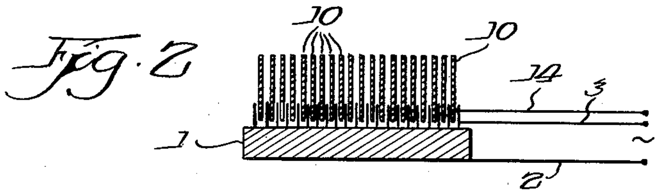
Figure 3:
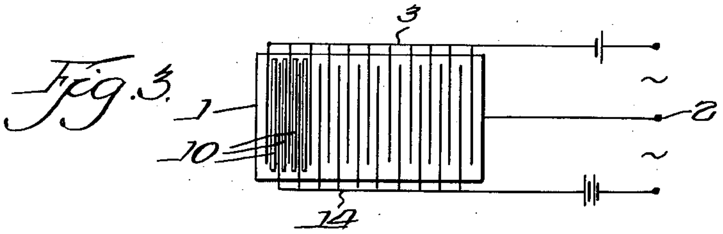
Figure 4:
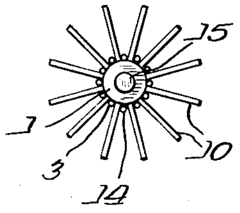
Figure 5:
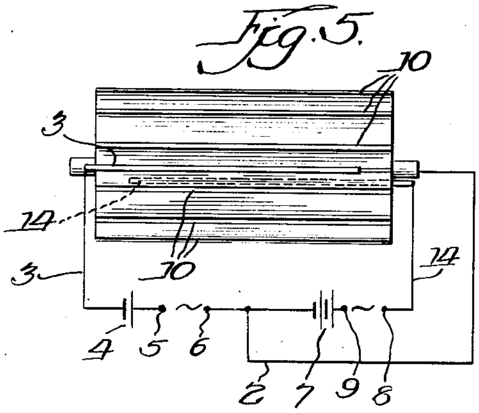

The foregoing and additional objects and features of the invention will be brought out in the course of the detailed description which will be presently rendered with reference to the accompanying drawings. In these drawings, Fig. 1 shows a known semi-conductor amplifier in diagrammatic circuit representation;

Figs. 2 and 3 illustrate diagrammatically a rectifier device made in accordance with the invention, Fig. 2 showing a longitudinal sectional view and Fig. 3 showing a diagrammatic top elevational view; and Figs. 4 and 5 represent in similar diagrammatic manner a modification employing a semi-conductor having a cylindrical surface, Fig. 4 showing a transverse sectional view and Fig. 5 an elevational side view of the embodiment.

Figure 1:
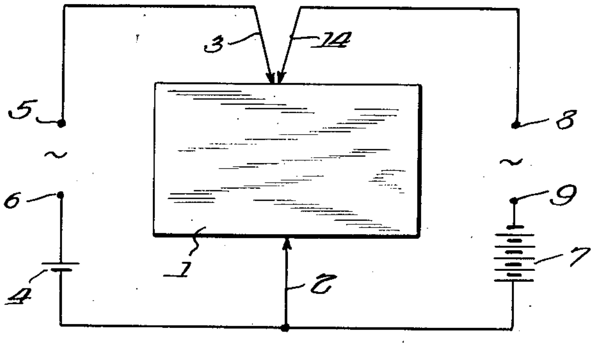

The known arrangement shown in Fig. 1 comprises a semi-conductor 1 which is connected with zero potential by means of the conductor 2. The conductor 2 connects with the base electrode of the device which has a large area connection with the semi-conductor 1. The input circuit is connected with a control electrode 3 and receives a small positive bias from the current source 4. The control voltages which are to be amplified are fed to the structure over the terminals 5 and 6. Disposed closely adjacent to the control electrode 3, which forms a pin-point contact, is the output electrode 14, which also forms a metallic pin-point contact in engagement with the semi-conductor. The current source 7 supplies to the output electrode 14 a negative auxiliary voltage, e. g., of about 20 volts. The amplified control voltage is tapped at the terminals 8 and 9.

In order to simplify explanations, reference numerals corresponding to those used in Fig. 1 have been applied in the new arrangements illustrated in Fig. 2 to 5 to designate identical parts.

Accordingly, referring to Figs. 2 and 3, disposed upon the semi-conductor 1 are a plurality of closely spaced electrode members forming knife-edge contacts in engagement with the semi-conductor, these electrode members being alternately associated with the input and output circuits 3 and 14, respectively. Numeral 10 indicates the insulating layers which may be made in the form of thin plates or leaves to separate the individual electrode members, as shown. Numeral 2 again designates the conductor connected with the base electrode which forms a large area connection with the semi-conductor.

The embodiment illustrated in Figs. 4 and 5 comprises a semi-conductor 1 of cross-sectionally circular shape, for example, of tubular shape, forming a cylindrical surface. The individual electrode members, which are associated with the input and output circuits 3 and 14 in similar manner as shown in Fig. 2, are disposed upon the body of semi-conductor 1 in fan-like manner, extending axially thereof, and are separated by the insulating members 10. The effective spacing between the input and output electrodes is increased by the radial arrangement of the electrode members, and the capacitance can thus be very considerably reduced. The base electrode is in this case a pinlike member extending axially through the semi-conductor body, as shown, thus forming a large area connection therewith. This pinlike matter is indicated by numeral 15.

The various component parts are in either embodiment suitably secured to form an operating unit.

The semi-conductor has been described as a germanium semi-conductor body. While such material may be preferred, it will be understood that other suitable semi-conductors may be used in exercising the invention.

Changes may be made within the scope and spirit of the appended claims which define what is believed to be new and desired to have protected by Letters Patent of the United States.

I claim:

1. A rectifier comprising a cylindrical tubular body of semi-conducting material, a base electrode having a relatively large contact area with said body, two additional electrodes, each of said additional electrodes comprising a plurality of electrode elements each having a knife edge in axially extending engagement with the outside of said body, said elements forming on said body rectifier contacts, and means for interconnecting said elements to form said additional electrodes.

2. A semi-conductor device comprising a circular body of semi-conductive material, a base electrode having a relatively large contact area with said body, at least two further electrodes coacting with said body, each of said further electrodes comprising a plurality of electrode members disposed upon said body in relatively close proximity and angularly spaced from one another to reduce capacitance therebetween, each of said electrode members forming a knife edge in engagement with said body, and insulating means disposed between adjacent electrode members of each further electrode.

3. The structure as set forth in claim 2, comprising a cross-sectionally circular member constituting said body of semi-conductive material, said electrode members being disposed upon said body and extending thereon axially thereof.

4. The structure as set forth in claim 2, comprising a tubular member constituting said body of semi-conductive material, said electrode members being disposed upon said body and extending thereon axially thereof.

5. A semi-conductor device comprising a body of semi-conductive material forming an arcuate surface, a base electrode having a relatively large contact area with said body, at least two further electrodes coacting with said body, each of said further electrodes comprising a plurality of electrode members disposed upon said surface in relatively close proximity and angularly spaced from one another to reduce capacitance therebetween, each of said electrode members forming a knife edge in engagement with said surface, and insulating means disposed between adjacent electrode members of each further electrode.

References Cited in the file of this patent

UNITED STATES PATENTS

| Number | Name | Date |
|---|---|---|
| 2,173,904 | Holst et al. | Sept. 26, 1939 |
| 2,524,035 | Bardeen et al. | Oct. 3, 1950 |